Sept. 28, 1971     R. L. FENNER     3,608,377

XEROMETER

Filed June 17, 1969     2 Sheets-Sheet 1

INVENTOR.
RALPH L. FENNER
BY
*Robyn Hilcox*
ATTORNEY

Sept. 28, 1971   R. L. FENNER   3,608,377
XEROMETER

Filed June 17, 1969   2 Sheets-Sheet 2

INVENTOR.
RALPH L. FENNER
BY
ATTORNEY

United States Patent Office 3,608,377
Patented Sept. 28, 1971

3,608,377
XEROMETER
Ralph L. Fenner, Mill Valley, Calif., assignor to
Hygrometrix, Inc.
Filed June 17, 1969, Ser. No. 834,093
Int. Cl. G01w 1/00; G01n 19/10
U.S. Cl. 73—337.5
9 Claims

ABSTRACT OF THE DISCLOSURE

A humidity sensing device called a xerometer, having a rib of a seed-throwing arm which forms the extension of a seed pod of a seed-throwing plant affixed to a suitable pin mounted on the face of a readable gauge and preferably is provided with a light-weight pointer, such as one of thin beryllium copper. In this form, the gauge markings extend through an angle of about one and one-third turns and the gauge face assumes the shape of a spiral. A preferred form of xerometer, however, utilizes a "chip" which comprises a resilient metal saddle, preferably formed of beryllium copper of a thickness of about one one-thousandth of an inch, and preferably carrying three of the spines rigidly connected thereto at their ends. When the vegetable fibers are dry, their warp force bends the metal plate to form an arc, the ends of which lie at an angle of about 60° with respect to each other. It should be noted that as the elements dry they exert a constant warp force upon the metal member, which causes it to bend in equal increments directly proportional to the relative humidity of the environment from the 100% humidity of the straight form to zero humidity.

---

It is an object of this invention to provide a xerometer, which is defined as a device which is sensitive to changes in vapor pressure (i.e., relative humidity) and which gives a reading indicating the relative dryness (or its converse) relative humidity of the environment in which the meter is located.

It is a primary object of the present invention to provide a simple meter device which is sensitive to relative dryness, i.e., vapor pressure, and which gives a reliable and easily readable indication of the relative dryness.

It is another object of the present invention to provide a device of the class described which is simple in construction, reliable in its operation, which has a long life and which is not affected by extraneous conditions, such as being in a gaseous environment of three thousand pounds per square inch pressure, or by being immersed in gasoline, alcohol, and similar large molecular fluids.

It is still a further object of the invention to provide a xerometer which has the same curve of hysteresis on both absorption and disorption cycles, has long life and a rapid speed of response.

These and other objects of the invention will be apparent from the following detailed description of the device taken in conjunction with the accompanying drawings in which.

Figure 6:
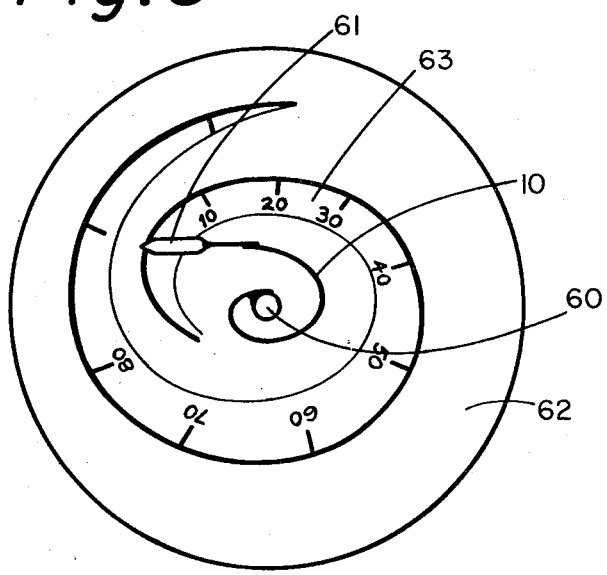
FIG. 6 is the face of a meter using the xeric element of FIG. 5 and showing the form of the scale needed for this type of instrument.

In the preferred form of my invention I prefer to use a bridled element of the type shown in FIGS. 6 to 8, inclusive, of my above-mentioned application. Such an element has the xeric fibers attached to its supporting plate only at its end and hence is really only partially bridled thereto, but such elements in this art are commonly referred to as "bridled" as it is assumed that a fully bridled element (i.e., one in which the xeric element is attached to the plate throughout its entire length) will be so specified. The bridling element preferably comprises a saddle formed of thin resilient material, such as beryllium copper, with a thickness of one one-thousandth of an inch. I have found that a suitable size for practical application of the invention is a saddle formed of a sheet 25 of such material, having a length of fourteen millimeters and a width of two millimeters. Each end is bent back upon a common face to form opposing pockets 28 at the respective ends of the chip, each tab 26 having a length of two millimeters. This leaves a chip, or saddle, having a pocket 28 at each end and with an overall length of ten millimeters and an overall width of two millimeters.

Figures 1, 2:
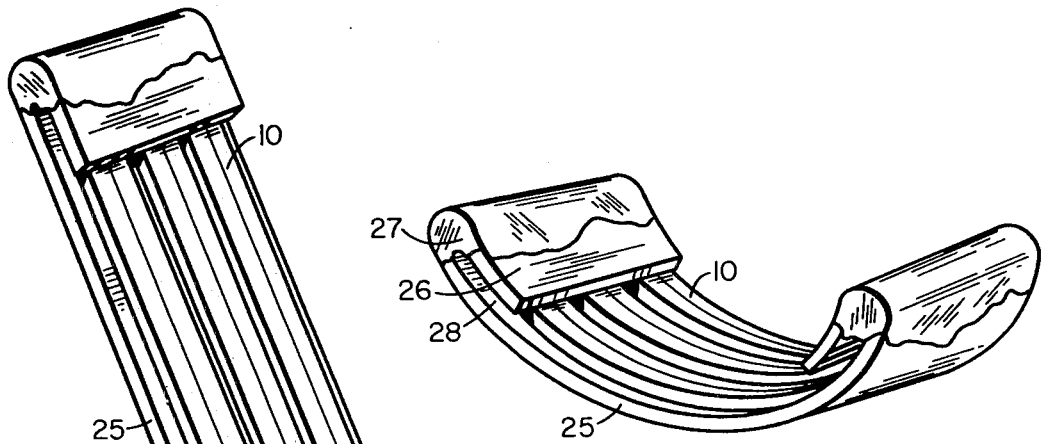
FIG. 1 is a greatly enlarged perspective view of the chip, or partially bridled xeric element, of the above-mentioned application showing its form when the moisture-sensitive fibers register saturation of 100% humidity.
FIG. 2 is a perspective view of the xeric element of FIG. 1 shown in the form which it assumes when the fibrous moisture-sensitive elements are completely dry.
Figure 3:
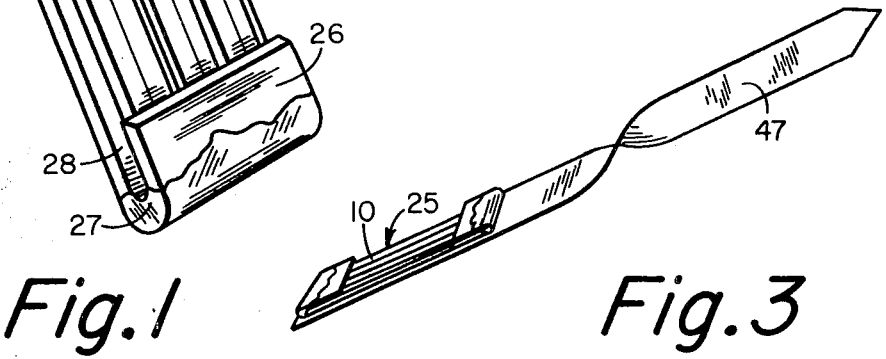
FIG. 3 is a perspective view, on a reduced scale but still enlarged scale, showing a light pointer, such as one formed of beryllium copper foil or very light plastic, attached to the chip of FIGS. 1 and 2, the xeric element shown being in a saturated condition.

The moisture-sensitive element 10 comprises the spine or the rib of the throwing arm of a seed-throwing plant, such as *Geranium dissectum*, *Geranium Richardsonii*, *Geranium caespitosum*, or *Geranium eriostemon*. The seed pods are harvested after the seeds have been thrown. Preferably, the throwing arms are removed from the remainder of the seed pod. These arms soaked in warm water, preferably held to the temperature of the range from about 80° to about 100° F. for a period of about three weeks, or until the fibrous covering of the rib arm is readily separated from the rib by pulling the arm through the tightly compressed fingers of an operator. A section of nine millimeters in length is taken from these ribs 10 to be used as the bridled element. Since the ribs of the preferred plants are flat on one side and rounded on the other, it is a simple matter to place them flat on the chip 25; and if more than one element is used on a chip, to place all of them flat side against the chip so that the warp force of all of them work in the same direction. Preferably, three or four such elements 10 are used, as I have found that they equalize the small variances that may be found in individual elements, but further, that several are desirable to easily overcome the anti-bending characteristics of the chip. The chip 25 with its xeric fibers 10 with their ends in the respective pockets 28, is immediately dip-soldered in melted solder. The pockets 28 of the chip are thus filled with solder 27, thus rigidly attaching the ends of the respective fibers to the saddle 25. While the members 10 are of vegetable composition and therefore can be burned, and do suffer an irreversible loss of effectiveness when heated to a temperature of above 125° C., the momentary dipping of the completely saturated fibers in the liquid solder does not harm them. The resultant chip, or bridled element, at this stage continues to assume the form shown in FIG. 1, in which the saddle 25 is perfectly straight, as the fibers are still saturated. However, as soon as the fibrous elements are permitted to dry, their warp force (each element having a warp force of about five grams when dry), causes the saddle 25 to bend to form the arcuate member shown in FIG. 2. The elements 10 in their dry and natural state, form a helix lying in a single plane, so that the saddle 25 is subjected to a simple bending action only, and not to a complicated twisting.

The chip 25 is rigidly secured at its ends to a pointer 47, preferably made of a thin sheet of beryllium copper by any suitable means, such as soldering or cementing with epoxy cement. One end of the pointer is rigidly secured to a pin 45 mounted on the face of a scale or gauge 46. Preferably, the pointer 47 will be twisted as shown, in order to provide a flat face parallel to the face of the scale 46 and thus make it more visible. It will be understood that the chip 25 will be perpendicular to the face of the scale 46 as its bending movement will be in a plane parallel to the face of the scale. The scale is marked in substantially equal increments by markings 48 indicative of the various degrees of humidity, usually from zero to 100%.

Figure 4:
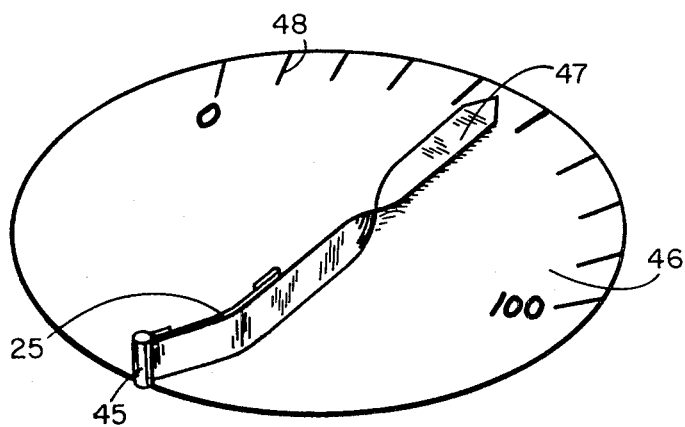
FIG. 4 is a perspective view of the xeric element shown in FIG. 3 attached to the face of a xerometric gauge in a partially dry state, showing an indication of almost 50%.
Figure 5:
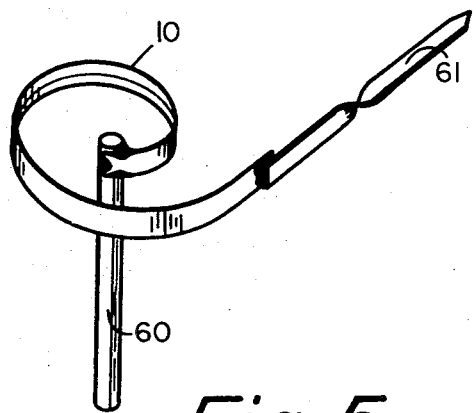
FIG. 5 shows a simpler form of xerometer in which the fibrous rib is rigidly secured to a mounting pin and carries a light pointer, such as one made of beryllium copper or plastic, at its free end.

A more simple but less desirable form of xerometer is shown in FIGS. 5 and 6. In this form a single fiber 10 is rigidly secured to a suitable pin 60 centrally located on a scale 62 by any suitable means, such as solder or epoxy cement; and a light indicator, such as a pointer 61 formed of beryllium copper foil is attached to the other end. In the dry state of the xeric element 10, the pointer assumes the forms shown in FIG. 5. The pin 60 is mounted in the center of a scale 62 in which the markings, or indicia, 63 form a spiral extending through an arc of about one and one-third or one and one-half turns, roughly from about 480° to about 540°, since this is the arc of travel of the free end of the fiber 10 from the perfectly dry to the fully saturated condition. A typical scale is shown in FIG. 6 and it is obvious that it is not as easy to read as that shown in FIG. 4. However, it should be noted that as moisture increases, the fiber 10 straightens out, so that the pointer actually travels through a spiral path and hence the pointer 61 will always be over the scale 63 if the indicia is properly formed. A further disadvantage of this form of xerometer lies in the fact that individual fibers 10 sometimes vary from the norm, and hence the scale 63 may require slight calibration, which is not necessary in the form shown in FIG. 4, as the use of a plurality of fibers 10 on a chip 25 results in a movement closer to the standards norm than may be true of an individual element. The xerometer of FIGS. 5 and 6, like that of FIGS. 1 to 4, inclusive, can be used in varying environments, such as in high pressure systems, or in one designed to test the moisture in a normally moisture-free environment, such as oil, alcohol, acetone, and the like.

It will be understood that the drawings and the above disclosure show two preferred embodiments of my invention, but that many modifications will occur to those skilled in the art which do not depart from the inventive concepts herein disclosed. Not only is it possible to use the partially bridled form shown in FIGS. 1 to 4, inclusive, or the completely unbridled form shown in FIGS. 5 and 6, but it is possible to use a fully bridled element in which the fibrous element 10 is attached throughout its length to a resistant plate. It is also obvious to those skilled in the art that the pin 45 or 60, as the case may be, can be made adjustable so that it could be readily adjusted by an operator, such as the adjustment of a common barometer. Also, such xerometer can be made which will register only over a certain portion of the scale, if that is desired, by fully bridling the xeric fiber to the saddle. Accordingly, it is intended that the appended claims cover such modifications as fall within the true spirit and concepts of the invention.

I claim:
1. A xerometer comprising the combination of a scale for registering relative humidity, a pointer for said scale, and means for moving said pointer comprising the seed-throwing arm of a seed pod of a plant which throws its seeds, said arm being characterized by having a substantially uni-planar movement, a rapid response to changes in relative humidity, inherent strength sufficient to avoid breakage when movement is resisted, and its warp movement is reversible on a substantially identical hysteresis curve on both desorption and adsorption.

2. The combination of claim 1 in which the seed-throwing arm is taken from the seed pod of Geranium dissectum.

3. The combination of claim 1 in which the seed-throwing arm is taken from the seed pod of Geranium Richardsonii.

4. The combination of claim 1 in which the seed-throwing arm is taken from the seed pod of Geranium caespitosium.

5. The combination of claim 1 in which the seed-throwing arm is taken from the seed pod of Geranium eriostemon.

6. The combination of claim 1 in which the seed-throwing arm is attached at its ends to a metallic saddling element.

7. A xerometer comprising a saddle formed of a thin resilient metal, a moisture-sensitive fiber taken from the seed-throwing arm of the seed pod of a group of plants consisting of Geranium dissectum, Geranium Richardsonii, Geranium caespitosum and Geranium eriostemon, means for rigidly securing the fiber at its ends to the metallic saddle, a scale for registering degrees of relative humidity, and means for mounting the saddle for movement across the face of said scale.

8. The combination of claim 7 wherein a plurality of the seed-throwing arms are secured to the saddle.

9. The xerometer of claim 7 in which the metallic filament comprises a sheet of beryllium copper with a thickness of approximately one-thousandth of an inch.

References Cited

UNITED STATES PATENTS

| 2,699,062 | 1/1955 | Tomaschek | 73—337.5 |
| 3,135,117 | 6/1964 | Fenner | 73—337 |
| 3,198,011 | 8/1965 | Fenner | 73—337.5 |
| 3,306,108 | 2/1967 | Harrington | 73—337 |

OTHER REFERENCES

"Gray's Manual of Botany" rewritten by Merrit Lyndon Fernald; eighth edition, copyright 1950, pages 946 and 947.

"Just Weeds" by Edwin Rollin Spencer, page 141, copyright 1940 and 1957.

LOUIS R. PRINCE, Primary Examiner

D. E. CORR, Assistant Examiner

U.S. Cl. X.R.

73—337